United States Patent [19]
Frerichs

[11] Patent Number: 6,036,208
[45] Date of Patent: Mar. 14, 2000

[54] TRUCK BED PULL OUT STEP SYSTEM

[76] Inventor: Stephen Arnold Frerichs, 901 Crested Butte, Hewitt, Tex. 76712

[21] Appl. No.: 09/019,972

[22] Filed: Feb. 6, 1998

Related U.S. Application Data

[63] Continuation of application No. 08/770,567, Dec. 19, 1996, Pat. No. 5,716,064.

[51] Int. Cl.⁷ ....................................................... B60R 3/02
[52] U.S. Cl. ........................................ 280/166; 280/164.1
[58] Field of Search .................................... 280/166, 163, 280/164.1; D12/203; 296/62

[56] References Cited

U.S. PATENT DOCUMENTS

| | | | |
|---|---|---|---|
| 1,359,480 | 11/1920 | Applin | 280/163 |
| 4,108,458 | 8/1978 | Owens | 280/166 |
| 4,200,303 | 4/1980 | Kelly | 280/166 |
| 4,528,998 | 7/1985 | Gamm | 135/75 |
| 4,753,447 | 6/1988 | Hall | 280/163 |
| 5,501,475 | 3/1996 | Bundy | 280/166 |

*Primary Examiner*—Lanna Mai
*Assistant Examiner*—Andrew Ririe
*Attorney, Agent, or Firm*—Myers Bigel Sibley & Sajovec

[57] ABSTRACT

A truck bed pull out step system installed under the front of a passenger pickup truck bed on one or both sides gives the user the ability to enter the pickup bed area or retrieve items with ease. When not in use is concealed under pickup bed.

31 Claims, 2 Drawing Sheets

TRUCK BED PULL OUT STEP SYSTEM

This is a continuation of Ser. No. 08/770,567 field on Dec. 19, 1996 now U.S. Pat. No. 5,716,064.

Passenger pickup trucks or used in many ways, for pulling trailers to utility applications. Access to the pickup bed area has always been limited to the use of the rear bumper. Many times because of a trailer that is hooked to a pickup makes the rear bumper not accessible or is inconvenient to use.

The pull out step system is installed near the front of the pickup bed using the rear axle front spring hanger and spring hanger bolt for mounting and can be mounted on one or both sides. When not in use the pull out step system can be pushed in a closed position and is secured with a push button latch. When in a closed position it is concealed under pickup bed.

The pull out step system is fabricated in a way as to give nice appeal making it attractive.

There is a need for the pull out step system which is rugged and can support substantial weight, yet is simple in design, comprises a minimal number of pieces, and is consequently simple to install.

The pull out step system consists of two parts, one is stationary which is the mounting bracket. The other is movable which is the step.

The stationary mounting bracket is made universal so that it fits any full size passenger pickup truck. The mounting bracket mounts onto the rear axle front spring hanger using the bolt that secures the spring to the hanger. The mounting bracket is secured on the outside of the spring hanger. Once secured the mounting bracket also has an adjustable bolt that acts as an leverage support. This adjustable bolt is screwed in an upward direction until it wedges against the bottom of the end of the said spring. Once adjustable bolt is wedged then a lock nut is screwed upward until tight providing a locked position for the adjustable bolt.

The movable step is possible by using square tubing that telescopes through a piece of larger square tubing. The larger square tube is part of the stationary bracket. A clevis pin is placed at the end of the smaller tube so when in an out position acts as a stop. And secured with a push button latch when in a closed position.

BRIEF DESCRIPTION OF THE DRAWINGS

The invention is described in more detail hereinafter with reference to the accompanying drawings, wherein like reference characters refer to the same part throughout the several views and in which:

Referring to FIGS. 1, 2 and 3 the pull out step system invention, generally, a step device 15 disposed beneath the level of the truck bed 14. Stationary mounting bracket 3A, 3B, 3C and 3D being made of one piece is supported by spring hanger bolt 4 and secured by spring hanger bolt nut 5 and further supported by spring hanger 7, and spring hanger is supported by truck frame 12. Stationary mounting bracket is also supported by adjustable wedge bolt 8, which is wedge against spring end 6. Once adjustable wedge bolt 8 is in place lock nut 9 is screwed upward until tight against bottom of stationary mounting bracket 3D. Locking adjustable wedge bolt 8 into a stationary state.

Figure 1:
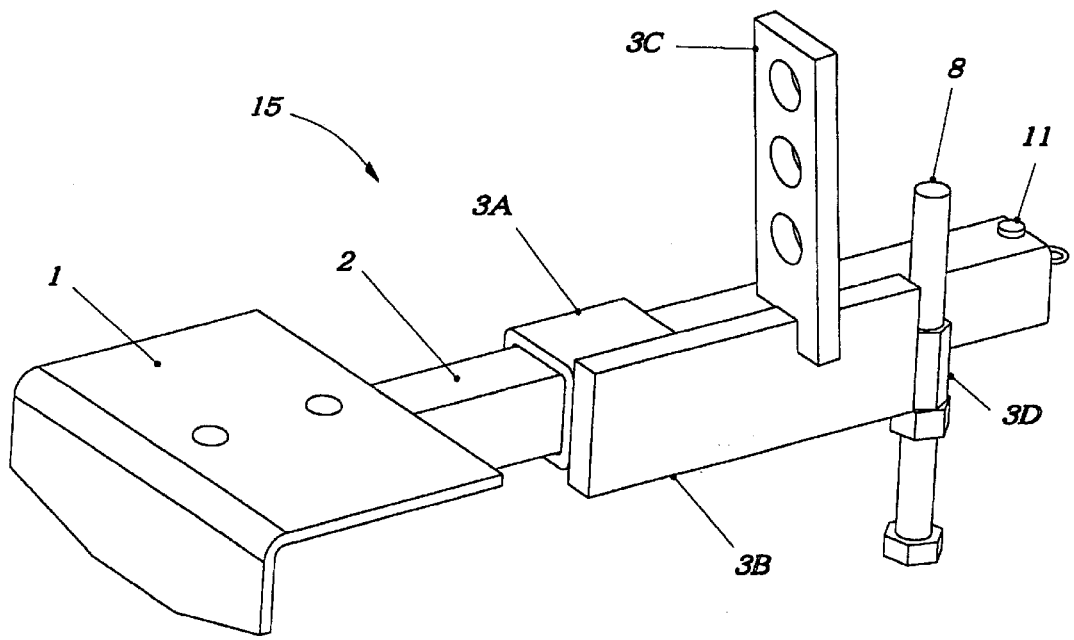
FIG. 1 is a perspective view illustration one embodiment of pull out step system of the invention.
Figure 2:
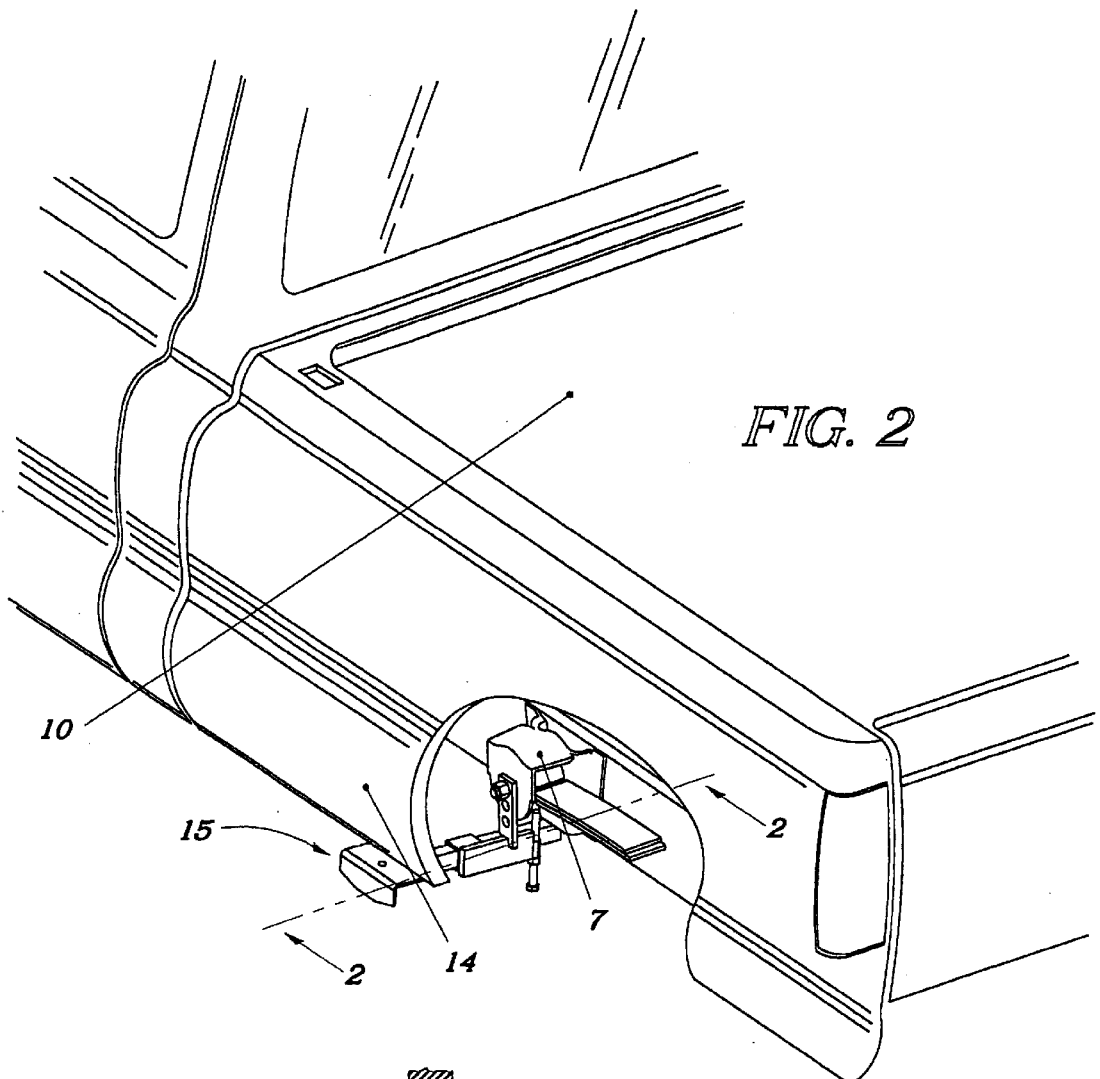
FIG. 2 is a perspective view of a truck incorporating an embodiment of the pull out step system apparatus of the present invention.
Figure 3:
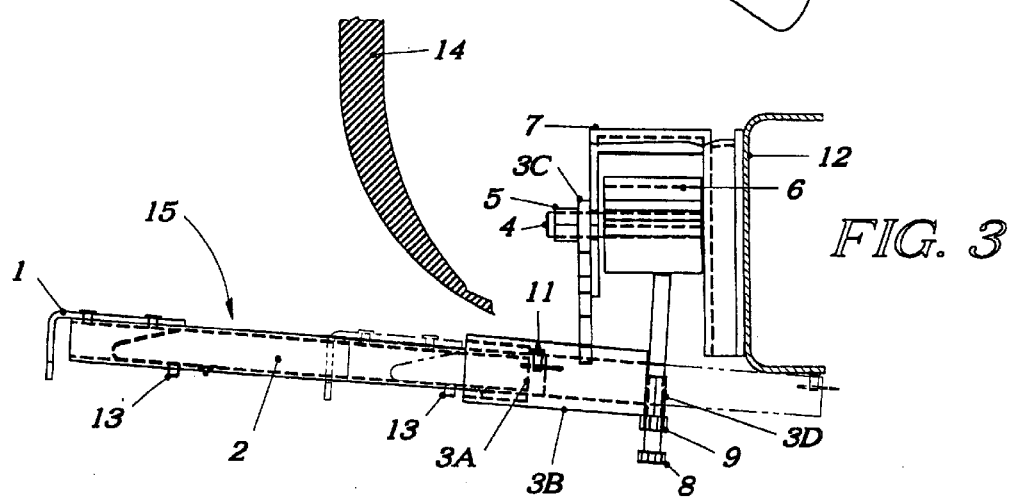
FIG. 3 is an enlarged vertical sectional view taken along the line 2—2 of FIG. 2.

When the step device 15 is in a closed position it is secured by a push button latch 13. When the step device is in a closed position it is under truck bed 14. When the step device is in a out position it limited by it's out travel by a stop 11. When in an out position user can use the step 1 to step up providing access to truck bed area 10. When user is finished user pushes step 1 which is comprised of a telescoping shaft 2 and push button latch 13 back into a closed position which is illustrated best in FIG. 3 in which the dotted line of the step 1 and telescoping shaft 2 represent a closed position. Telescoping shaft 2 telescopes through stationary shaft support 3A both being made of square tubing. Stationary shaft support 3A is larger allowing telescoping shaft 2 which is smaller to slide inward and outward.

Various modifications and changes may be made with regard to the foregoing detailed description without departing from the spirit of the invention.

I claim:

1. A pull out step device for use with an automotive vehicle having an underside, said device comprising:
    (a) a stationary mounting bracket arranged and configured to fixedly secure said device to the underside of the automotive vehicle;
    (b) a step member including a step portion, said step member extensibly coupled with said mounting bracket such that said step member may be selectively positioned between a retracted position wherein said step portion is disposed adjacent said mounting bracket and an extended position wherein said step portion is spaced apart from said mounting bracket; and
    (c) a latch member selectively operable to interlock with said step member and thereby secure said step member in said retracted position.

2. The device of claim 1 wherein said mounting bracket includes a first telescoping member and said step member includes a second telescoping member slidably engaging said first telescoping member.

3. The device of claim 2 including a travel stop which limits extension of said step portion away from said mounting bracket.

4. The device of claim 3 wherein said latch member includes a push button latch including a button member secured to one of said first and second telescoping members, and wherein, when said step member is in said retracted position, said button member engages the other of said first and second telescoping members so as to prevent extension of said step member and said button member is selectively displaceable to allow extension of said step member.

5. The device of claim 1 wherein said mounting bracket includes means for fixedly securing said mounting bracket to a spring hanger forming a part of the automotive vehicle.

6. The device of claim 5 wherein said means for fixedly securing said mounting bracket includes a plate having a bolt hole formed therein.

7. A pull out step system comprising:
    (a) an automotive vehicle havig an uderside and a spring hanger attached to and depending from said underside; and
    (b) a pull out step device including:
        (1) a stationary mounting bracket fixedly mounted to said spring hanger; and
        (2) a step member including a step portion, said step member extensibly coupled with said mounting bracket such that said step member mat be selectively positioned between a retracted position wherein said step portion is disposed beneath said underside of said automotive vehicle and an extended position wherein said step portion is positioned outwardly beyond said underside of said automotive vehicle;

(c) wherein said automotive vehicle includes a suspension spring and a spring hanger bolt, said suspension spring coupled with said spring hanger by said spring hanger bolt, and wherein said mounting bracket includes a bracket bolt hole formed therein and said mounting bracket is coupled to said spring hanger by said spring hanger bolt which extends through said bracket bolt hole.

8. The system of claim 7 wherein said mounting bracket further includes an adjustable brace mechanism spaced apart from said bracket bolt hole and abutting said underside of said automotive vehicle to selectively adjust the angle of said mounting bracket relative to said automotive vehicle.

9. The system of claim 7 including fastening means cooperative with said spring hanger bolt to couple said mounting bracket to said spring hanger, and wherein said mounting bracket is secured to said vehicle solely by said fastening means and said spring hanger bolt.

10. The system of claim 7 wherein said mounting bracket includes a first telescoping member and said step member includes a second telescoping member slidably engaging said first telescoping member.

11. The system of claim 10 including a travel stop which limits extension of said step portion away from said mounting bracket.

12. A pull out step system comprising:
(a) an automotive vehicle having an underside and a spring hanger attached to and depending from said underside; and
(b) a pull step device including:
  (1) a stationary mounting bracket fixedly mounted to said spring hanger;
  (2) a step member including a step portion, said step member extensibly coupled with said mounting bracket such that said step member may be selectively positioned between a retracted position wherein said step portion is disposed beneath said underside of said automotive vehicle and an extended position wherein said step portion is positioned outwardly beyond said underside of said automotive vehicle; and
  (3) a latch member selectively operable to interlock with said step member and thereby secure said step member in said retracted position.

13. The system of claim 12 wherein said mounting bracket includes a first telescoping member and said step member includes a second telescoping member slidably engaging said first telescoping member, wherein said latch member includes a push button latch including a button member secured to one of said first and second telescoping members, and wherein, when said step member is in said retracted position, said button member engages the other of said first and second telescoping members so as to prevent extension of said step member and said button member is selectively displaceable to allow extension of said step member.

14. A pull out step system comprising:
(a) an automotive vehicle having an underside, an exterior side body panel having a lower terminal edge, and a spring hanger attached to and depending from said underside; and (b) a pull out step device including:
  (1) a stationary mounting bracket fixedly mounted to said spring hanger, said mounting bracket including a plate having a bolt hole formed therein for fixedly securing said mounting bracket to said spring hanger;
  (2) a step member including a step portion, said step member horizontally extensibly coupled with said mounting bracket such that said step member may be selectively positioned between a retracted position wherein said step portion is disposed inwardly of said exterior body panel and beneath said underside of said automotive vehicle and an extended position wherein said step portion is positioned outwardly beyond said underside and said exterior side body panel and a portion of said step member underlies said lower terminal edge of said exterior side body panel; and
  (3) wherein said mounting bracket further includes an adjustable brace mechanism abutting said underside of said automotive vehicle and operable to selectively adjust the angle of said stationary mounting bracket relative to said automotive vehicle.

15. A pull out step system comprising:
(a) an automotive vehicle having an underside and an exterior side body panel having a lower terminal edge; and
(b) a pull out step device including:
  (1) a stationary mounting bracket fixedly mounted to said underside of said automotive vehicle;
  (2) a step member including a step portion, said step member horizontally extensible coupled with said mounting bracket such that said step member may be selectively positioned between a retracted position wherein said step portion is disposed inwardly of said exterior body panel and beneath said underside of said automotive vehicle and an extended position wherein said step portion is positioned outwardly beyond said underside and said exterior side body panel and a portion of said step member underlies said lower terminal edge of said exterior side body panel; and
  (3) a latch member selectively operable to interlock with said step member and thereby secure said step member in said retracted position.

16. The system of claim 15 wherein said mounting bracket includes a first telescoping member and said step member includes a second telescoping member slidably engaging said first telescoping member, wherein said latch member includes a push button latch including a button member secured to one of said first and second telescoping members, and wherein, when said step member is in said retracted position, said button member engages the other of said first and second telescoping members so as to prevent extension of said step member and said button member is selectively displaceable to allow extension of said step member.

17. A pull out step device for use with an automotive vehicle having an underside, said device comprising:
(a) a stationary mounting bracket arranged and configured to fixedly secure said device to the underside of the automotive vehicle;
(b) a step member including a step portion, said step member movably coupled with said mounting bracket such that said step member may be selectively positioned between a stored position wherein said step portion is disposed adjacent said mounting bracket and an operative position wherein said step portion is spaced apart from said mounting bracket; and (c) a latch member selectively operable to interlock with said step member and thereby secure said step member in said stored position.

18. The device of claim 17 wherein said mounting bracket includes means for fixedly securing said mounting bracket to a spring hanger forming a part of the automotive vehicle.

19. The device of claim 18 wherein said means for fixedly securing said mounting bracket includes a plate having a bolt hole formed therein.

20. The device of claim 19 wherein said mounting bracket further includes an adjustable brace mechanism adapted to engage the underside of the vehicle and operable to selectively adjust the angle of said stationary mounting bracket relative to the automotive vehicle.

21. A pullout step system comprising:
(a) an automotive vehicle having an underside and a spring hanger attached to and depending from said underside; and
(b) a pull out step device including:
  (1) a stationary mounting bracket fixedly mounted to said spring hanger; and
  (2) a step member including a step portion, said step member movably coupled with said mounting bracket such that said step member may be selectively positioned between a stored position wherein said step portion is disposed beneath said underside of said automotive vehicle and an operative position wherein said step portion is positioned outwardly beyond said underside of said automotive vehicle;
(c) wherein said automotive vehicle includes a suspension spring and a spring hanger bolt, said suspension spring coupled with said spring hanger by said spring hanger bolt, and wherein said mounting bracket includes a bracket bolt hole formed therein and said mounting bracket is coupled to said spring hanger by said spring hanger bolt which extends through said bracket bolt hole.

22. The system of claim 21 wherein said mounting bracket further includes an adjustable brace mechanism spaced apart from said bracket bolt hole and abutting said underside of said automotive vehicle to selectively adjust the angle of said mounting bracket relative to said automotive vehicle.

23. The system of claim 21 including fastening means cooperative with said spring hanger bolt to couple said mounting bracket to said spring hanger, and wherein said mounting bracket is secured to said vehicle solely by said fastening means and said spring hanger bolt.

24. A pullout step system comprising:
(a) an automotive vehicle having an underside and a spring hanger attached to and depending from said underside; and
(b) a pull out step device including:
  (1) a stationary mounting bracket fixedly mounted to said spring hanger;
  (2) a step member including a step portion, said step member movably coupled with said mounting bracket such that said step member may be selectively positioned between a stored position wherein said step portion is disposed beneath said underside of said automotive vehicle and an operative position wherein said step portion is positioned outwardly beyond said underside of said automotive vehicle; and
  (3) a latch member selectively operable to interlock with said step member and thereby secure said step member in said stored position.

25. A pull out step system comprising:
(a) an automotie vehicle having an underside, exterior said body panel having a lower terminal edge, and a spring hanger attached to and depending from said underside; and
(b) a pull out step device including:
  (1) a stationary mounting bracket fixedly mounted to said spring hanger, said mounting bracket including means for fixedly securing said mounting bracket to said spring hanger; and
  (2) a step member including a step portion, said step member horizontally movably coupled with said mounting bracket such that said step member may be selectively positioned between a stored position wherein said step portion is disposed inwardly of said exterior body panel and beneath said underside of said automotive vehicle and an operative position wherein said step portion is positioned outwardly beyond said underside and said exterior side body panel and a portion of said step member underlies said lower terminal edge of said exterior side body panel;
  (3) wherein aid means or fixedly securing said mounting bracket includes a plate having a bolt hole formed therein;
  (4) wherein said mounting bracket further includes an adjustable brace mechanism engaging said underside of said vehicle and operable to selectively adjust the angle of said stationary mounting bracket relative to the automotive vehicle.

26. A pull out step system comprising:
(a) an automotive vehicle having an underside and an exterior side body panel having a lower terminal edge; and
(b) a pull out step device including:
  (1) a stationary mounting bracket fixedly mounted to said underside of said automotive vehicle; and
  (2) a step member including a step portion said step member horizontally movably coupled with said mounting bracket such that said step member may be selectively positioned between a stored position wherein said step portion is disposed inwardly of said exterior body panel and beneath said underside of said automotive vehicle and an operative position wherein said step portion is positioned outwardly beyond said underside and said exterior side body panel and a portion of said step member underlies said lower terminal edge of said exterior side body panel; and
  (3) a latch member selectively operable to interlock with said step member and thereby secure said step member in said stored position.

27. A pull out step system comprising:
(a) an automotive vehicle having an underside and a spring hanger attached to and depending from said underside; and
(b) a pull out step device including:
  (1) a stationary mounting bracket fixedly mounted to said spring hanger; and
  (2) a step member coupled with said mounting bracket said step member including a step portion positioned outwardly beyond said underside of said automotive vehicle;

(c) wherein said automotive vehicle includes a suspension spring and a spring hanger bolt, said suspension spring coupled with said spring hanger by said spring hanger bolt, and wherein said mounting bracket includes a bracket bolt hole formed therein and said mounting bracket is coupled to sad spring hanger by said spring hanger bolt which extends through said bracket bolt hole.

28. The system of claim 27 wherein said mounting bracket further includes an adjustable brace mechanism spaced apart from said bracket bolt hole and abutting said underside of said automotive vehicle to selectively adjust the angle of said mounting bracket relative to said automotive vehicle.

29. The system of claim 27 including fastening means cooperative with said spring hanger bolt to couple said mounting bracket to said spring hanger, and wherein said mounting bracket is secured to said vehicle solely by said fastening means and said spring hanger bolt.

30. The system of claim 27 wherein said automotive vehicle has an exterior side body panel having a lower terminal edge and a portion of said step member underlies said lower terminal edge of said exterior side body panel.

31. The device of claim 6 wherein said mounting bracket further includes an adjustable brace mechanism adapted to engage the underside of the vehicle and operable to selectively adjust the angle of said stationary mounting bracket relative to the automotive vehicle.

* * * * *

UNITED STATES PATENT AND TRADEMARK OFFICE
CERTIFICATE OF CORRECTION

PATENT NO. : 6,036,208
DATED : March, 14, 2000
INVENTOR(S) : Stephen Arnold Frerichs Page 1 of 1

It is certified that error appears in the above-identified patent and that said Letters Patent is hereby corrected as shown below:

Claim 4, column 2,
Line 45, correct "claim 3" to read -- Claim 2 --.

Claim 21, column 5,
Line 17, correct "pullout" to read -- pull out --.

Claim 24, column 5,
Line 52, correct "pullout" to read -- pull out --.

Claim 25, column 6,
Line 5, please insert -- an -- before "exterior".

Claim 27, column 7,
Line 6, correct "sad" to read -- said --.

Signed and Sealed this

Twenty-fifth Day of September, 2001

*Attest:*

NICHOLAS P. GODICI
*Attesting Officer*    Acting Director of the United States Patent and Trademark Office